(12) United States Patent
Lin et al.

(10) Patent No.: US 9,239,649 B2
(45) Date of Patent: Jan. 19, 2016

(54) METHOD FOR CORRECTING TOUCH POSITION

(71) Applicants: Kun-Yi Lin, Taipei (TW); Li-Pin Yeh, Taipei (TW)

(72) Inventors: Kun-Yi Lin, Taipei (TW); Li-Pin Yeh, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 136 days.

(21) Appl. No.: 14/078,480

(22) Filed: Nov. 12, 2013

(65) Prior Publication Data

US 2014/0139462 A1    May 22, 2014

Related U.S. Application Data

(60) Provisional application No. 61/728,812, filed on Nov. 21, 2012.

(30) Foreign Application Priority Data

Aug. 20, 2013 (TW) .............................. 102129867 A

(51) Int. Cl.
G06F 3/041 (2006.01)

(52) U.S. Cl.
CPC .................................... *G06F 3/0418* (2013.01)

(58) Field of Classification Search
CPC ............ G09G 5/00; G06F 3/02; G06F 3/045; G06F 3/041; G06K 11/06; G08C 21/00
USPC ...................... 345/173–175; 178/18.01–18.06
See application file for complete search history.

(56) References Cited

U.S. PATENT DOCUMENTS

| | | | |
|---|---|---|---|
| 2005/0030293 A1* | 2/2005 | Lai ................................ | 345/173 |
| 2012/0146931 A1* | 6/2012 | Iida .............................. | 345/173 |
| 2012/0169632 A1* | 7/2012 | Yu ................................ | 345/173 |
| 2014/0043251 A1* | 2/2014 | Wilson et al. ................. | 345/173 |

* cited by examiner

*Primary Examiner* — Pegeman Karimi
(74) *Attorney, Agent, or Firm* — Jianq Chyun IP Office

(57) ABSTRACT

A method for correcting a touch position and applied to an electronic apparatus is provided. The method includes: receiving a current touch event; obtaining prediction information of the current touch event based on correction information of a previous touch event which is received at a previous time point before the current touch event; obtaining correction information of the current touch event according to the prediction information and a measuring position of the current touch event; and updating a position of the current touch event at a display unit by using the correction information of the current touch event.

11 Claims, 3 Drawing Sheets

METHOD FOR CORRECTING TOUCH POSITION

CROSS-REFERENCE TO RELATED APPLICATION

This application claims the priority benefit of Taiwan application serial No. 102129867, filed on Aug. 20, 2013 and U.S. provisional application Ser. No. 61/728,812, filed on Nov. 21, 2012. The entirety of each of the above-mentioned patent applications is hereby incorporated by reference herein and made a part of this specification.

BACKGROUND OF THE INVENTION

1. Field of the Invention

The invention relates to a touch technology and, more particularly, to a method for correcting a touch position.

2. Description of the Related Art

As touch control technology and various application programs of electronic products develop rapidly, a touch control panel is widely used. A touch control panel of electronic products is touched to select and operate the electronic products according to a touch position on the touch control panel. For example, a cursor moves along with that the user fingers slide or drag at the touch control panel. However, an inconstant sliding speed or a slight shake of the fingers would result in frame jitter due to a system measuring error.

A liner regression algorithm, an interpolation or an extrapolation are usually used to solve the frame jitter problem. When the liner regression algorithm is used, information relative to a large amount of touch events are collected, and as the amount of collected information increases, the corrected touch operation at the screen is smoother. However, as the amount of information increases, calculating time becomes longer and reaction becomes slower. Furthermore, the interpolation or the extrapolation cannot execute a optimize process in a slow sliding, and thus the problem of frame jitter still exists in a slow sliding.

BRIEF SUMMARY OF THE INVENTION

A method for correcting a touch position is provided.

The method for correcting a touch position is applied to an electronic device. The method includes steps of: receiving a current touch event; obtaining prediction information of the current touch event based on correction information of a previous touch event which is received at a previous time point before the current touch event; obtaining correction information of the current touch event according to the prediction information and a measuring position of the current touch event; and updating a position of the current touch event at a display unit by using the correction information of the current touch event.

These and other features, aspects and advantages of the present invention will become better understood with regard to the following description, appended claims, and accompanying drawings.

DETAILED DESCRIPTION OF THE EMBODIMENTS

Figure 1:
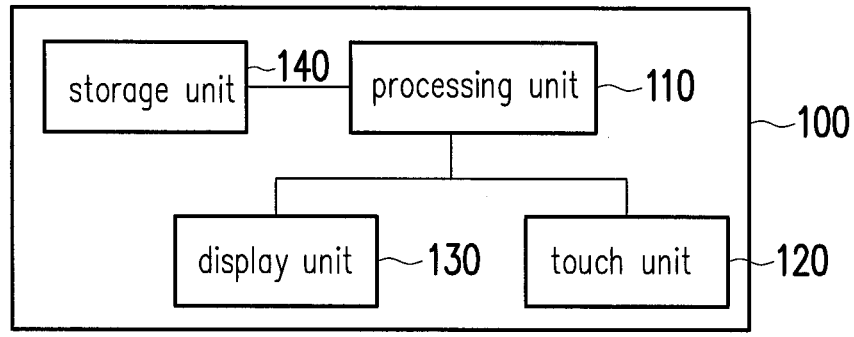
FIG. 1 is a block diagram showing an electronic device in an embodiment.

FIG. 1 is a block diagram showing an electronic device in an embodiment. Please refer to FIG. 1, the electronic device 100 includes a processing unit 110, a touch unit 120, a display unit 130 and a storage unit 140. The processing unit 110 is coupled to the touch unit 120, the display unit 130 and the storage unit 140. The electronic device 100 may be a mobile phone, a smart phone, a tablet computer, a notebook computer, a desktop computer, a vehicle computer or a navigation device, which is not limited herein.

In an embodiment, the processing unit 110 may be a central processing unit (CPU). The touch unit 120 may be a capacitive touch control panel or a resistive touch control panel. The display unit 130 may be a liquid crystal display (LCD) or a plasma display panel (PDP). The storage unit 140 may be a random access memory (RAM).

In the embodiment, a graphic processing unit is used to process images. The electronic device 100 may also include an independent display card, a graphic processing unit or a processing unit 110 to process images. The touch unit 120 may also be integrated to the display unit 130 to form a touch control display unit (such as a touch control screen). The electronic device 100 may include a bridge control unit (such as a south bridge chip or a north bridge chip), and the processing unit 110 is coupled to the touch unit 120, the display unit 130, the storage unit 140 and other peripheral devices via the bridge control unit.

Figure 2:
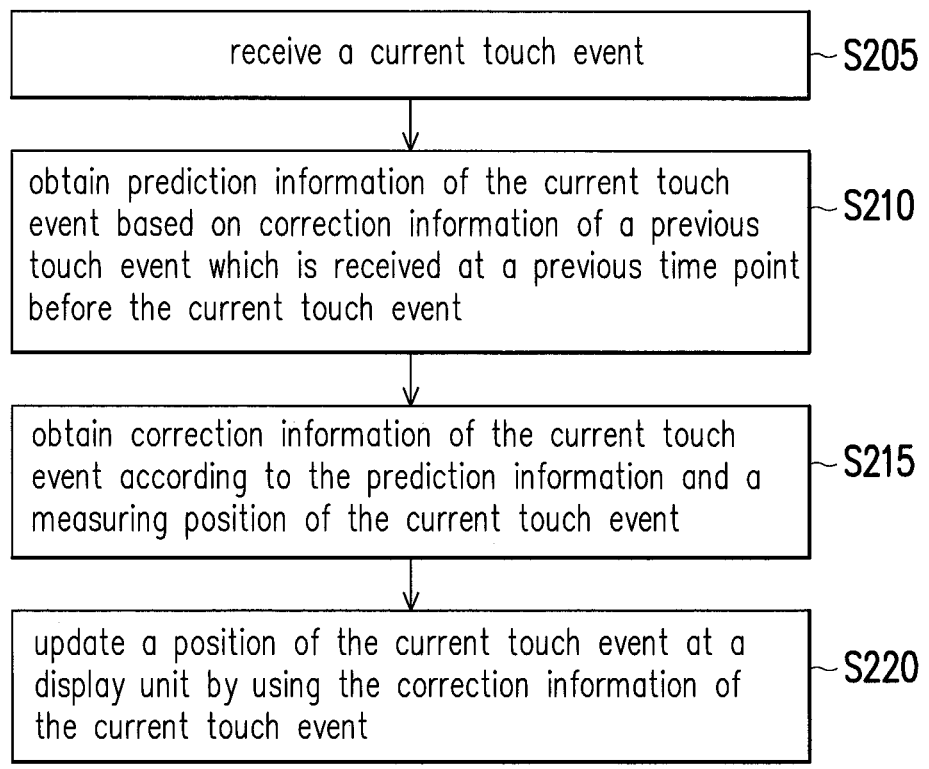
FIG. 2 is a flow chart showing a method for correcting a touch position in an embodiment.

FIG. 2 is a flow chart showing a method for correcting a touch position in an embodiment. Please refer to FIG. 1 and FIG. 2, in step S205, the processing unit 110 receives a current touch event via the touch unit 120. For example, the user touches the touch unit 120, and the touch unit 120 may capture the touch event corresponding to the touch at different time points and send the touch event to the processing unit 110.

Then, the processing unit 110 predicts the position of a current touch event according to the correction information of a previous touch event received at a previous time point. As shown in the step S210, the processing unit 110 obtains the prediction information of the current touch event based on the correction information of the previous touch event received at the previous time point before the current touch event. It assumes that the current time point is t, the processing unit 110 calculates the prediction information of the touch event received at the time point t (that is "the current touch event") by using the correction information of the touch event received at the previous time point t−1 (that is "the previous touch event").

The processing unit 110 further corrects a measuring position of the current touch event according to prediction information. As shown in step S215, the processing unit 110 obtains the correction information of the current touch event according to the prediction information and the measuring position of the current touch event.

A Kalman filter is taken as an example hereinafter. The correction information includes a correction position and a correction error, and the prediction information includes a prediction position and a prediction error. In the step S210, the correction position of the previous touch event (which is represented by $X_{t-1|t-1}$) is regarded as the prediction position of the current touch event (which is represented by $X_{t|t-1}$). A total value of the correction error of the previous touch event (which is represented by $p_{t-1|t-1}$) adding a prediction error value (which is represented by q) is regarded as the prediction error of the current touch event (which is represented by $p_{t|t-1}$). Two formulas (1) and (2) are obtained as follows:

$$X_{t|t-1} = X_{t-1|t-1} \quad (1)$$

$$p_{t|t-1} = p_{t-1|t-1} + q \quad (2)$$

In the step S215, the processing unit 110 calculates a gain value (which is represented by $K_t$) of the current touch event based on the prediction error and the measuring error value (which is represented by r) of the current touch event. The correction position of the current touch event (which is represented by $X_{t|t}$) is obtained based on the gain value and the prediction position of the current touch event (which is represented by $Z_t$). Moreover, the correction error of the current touch event (which is represented by $P_{t|t}$) is obtained based on the gain value and the prediction error of the current touch event.

The prediction error of the current touch event $P_{t|t-1}$ is divided by a value of the prediction error of the current touch event $P_{t|t-1}$ adding the measuring error value r, which obtains the gain value $K_t = p_{t|t-1}/(p_{t|t-1}+r)$. The measuring position of the current touch event $z_t$ minuses the prediction positions of the current touch event $x_{t|t-1}$, then multiples the gain value $K_t$, and adds the prediction position of the current touch event $x_{t|t-1}$ to obtain the correction position of the current touch event $X_{t|t}$. 1 minuses the gain value $K_t$ and multiples the prediction error of the current touch event $P_{t|t-1}$ to obtain the correction error of the current touch event $p_{t|t}$. That is, $(1-K_t)$ represents the weight of the prediction error of the current touch event $p_{t|t-1}$. Formulas (3) to (5) are obtained as follows:

$$K_t = p_{t|t-1}(p_{t|t-1}+r)^{-1} \quad (3)$$

$$x_{t|t} = x_{t|t-1} + K_t(z_t - X_{t|t-1}) \quad (4)$$

$$p_{t|t} = (1-K_t)p_{t|t-1} \quad (5)$$

The formula (1) and the formula (2) are used to predict the position. In the formula (1), when the current touch event is an initial touch event, which means there is no previous touch event, the measuring position of the current touch event is regarded as the prediction position of the current touch event. The formulas (3) to (5) are used to correct the position. Every calculation would update the gain value $K_t$ in order to obtain an optimized correction result, and the correction error $p_{t|t}$ of the optimized correction result is provided to the next calculation.

The gain value $K_t$ is for measuring reliability of the prediction position of the current touch event $x_{t|t-1}$ and the measuring position of the current touch event $z_t$. If the gain value $K_t$ is large, it means the reliability of the measuring position $z_t$ is high. If the gain value $K_t$ is small, it means the reliability of the prediction position of the current touch event $x_{t|t-1}$ is high. Thus, the gain value $K_t$ is used to adjust the correction of the current touch event.

If the touch control operation is at a constant speed, the gain value $K_t$ tends to a value. Since the errors of the prediction position and the measuring position do not change, the gain value $K_t$ would tend to a value and finally converge to the value without any change.

After the correction information of the current touch event is obtained, in step S220, the correction information of the current touch event is used to update the position of the current touch event at the display unit 130. That is, after the processing unit 110 calculates the correction information of the current touch event, the correction information (such as the correction position) is sent to a graphic process drive program or a graphic processor for drawing, and then it is displayed at the display unit 130.

Figure 3:
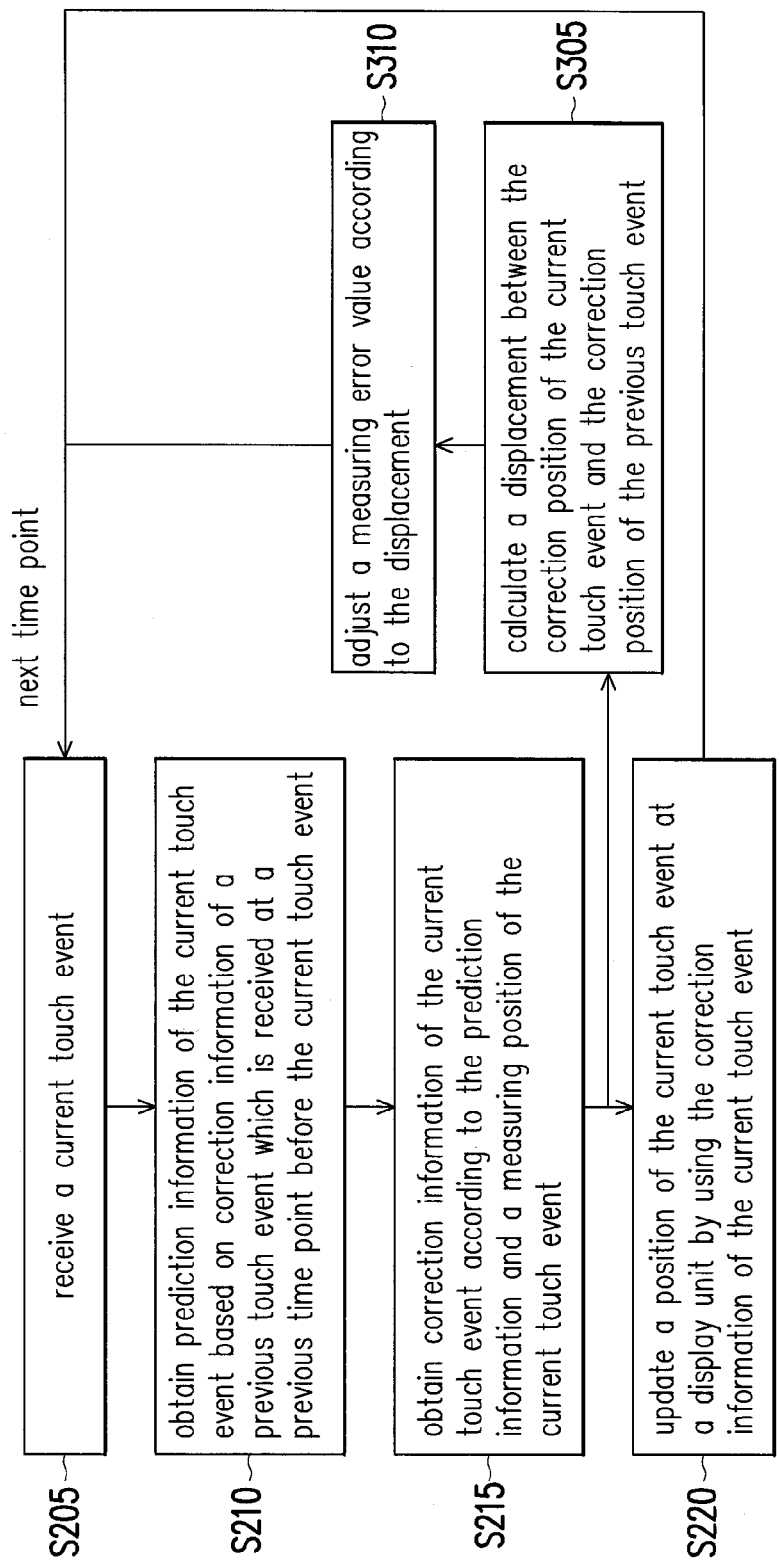
FIG. 3 is a flow chart showing a method for correcting a touch position in another embodiment.

FIG. 3 is a flow chart showing a method for correcting a touch position in another embodiment. Several steps shown in FIG. 3 are the same as those shown in FIG. 2, which are denoted by the same symbols and are omitted herein.

After the correction information of the current touch event is obtained, besides the step 220 is executed, step S305 may also be executed. In the step S305, the processing unit 110 further calculates a shift quantity between the correction position of the current touch event and the correction position of the previous touch event. Then, in step S310, the measuring error value is adjusted according to the shift quantity. The adjusted measuring error value covers the original measuring error value and is provided for the touch event at a next time point.

When the user slides at the touch unit 120 rapidly, the reliability of the measuring position of the current touch event is higher, and the measuring error value can be set smaller. That is, if the shift quantity is larger, it means the sliding speed is higher, the prediction position is not reliable, and the weight of the measuring position is higher (which means the gain value $K_t$ is larger). Thus, the measuring error value is set smaller to solve the frame delay problem.

When the user slides slowly, the reliability of the prediction position of the current touch event is high, and the measuring error value can be set large. That is, if the shift quantity is smaller, it means the sliding speed is lower, the prediction position is reliable, and the weight of the prediction position is higher (which means the gain value $K_t$ is smaller). Thus, the measuring error value is set larger to solve the frame jitter problem.

A threshold may be set as a determining basis of the sliding speed. When the shift quantity is larger than the threshold, the prediction error value is set larger. When the shift quantity is smaller than the threshold, the measuring error value is set smaller. Multiple groups of predetermined ranges may also be set as a determining basis of the sliding speed in consideration of the resolution of the display unit 130 and affection of other peripheral devices. Thus, the measuring error value is adjusted according to the predetermined range where the shift quantity is at and an adjusting value corresponding to the predetermined range.

For example, it assumes that the resolution of the display unit 130 is 1920×1200. Three groups of predetermined ranges "1 to 16", "16 to 32" and "32 above" are set in the electronic device 100, and the corresponding adjusting values are 0.1, 0.5 and 1, respectively. If the shift quantity is 10 which is at the predetermined range "1 to 16", the measuring error value is set to be 0.1. If the shift quantity is 35, the measuring error value is set to be 1. Furthermore, the measuring error value may also be adjusted to a value of 0 to 0.1, 0.1 to 0.5 or 0.5 to 1 according to a function.

The prediction error value may be adjusted by the processing unit 110 according to the shift quantity, or the prediction error value and the measuring error value are both adjusted according to the shift quantity. That is, no matter the measuring error value or the prediction error value is adjusted, the gain value $K_t$ would change accordingly and affect the correction of the current touch event. Consequently, it may be that one of the prediction error value and the measuring error value is adjusted, or both of the prediction error value and the measuring error value are adjusted at the same time.

Figure 4:
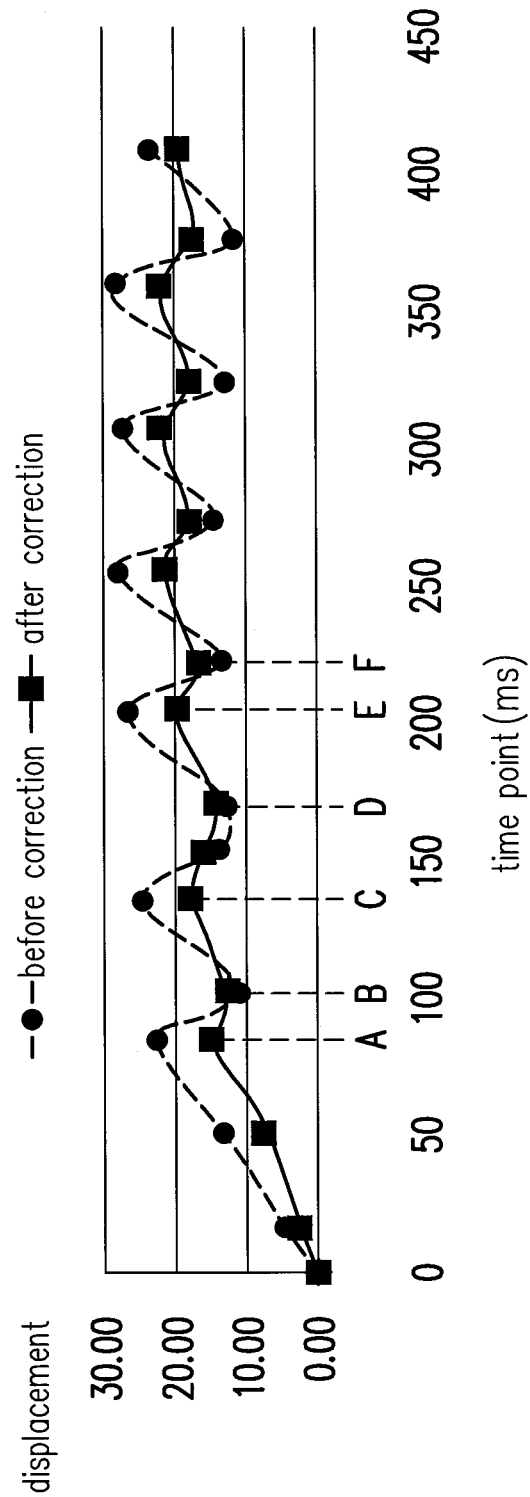
FIG. 4 is a schematic diagram showing shift quantities before and after correction in an embodiment.

FIG. 4 is a schematic diagram showing shift quantities before and after correction in an embodiment. Please refer to FIG. 4 and table 1A and table 1B in the following. In the embodiment, the X-coordinate of the shift quantity is taken as an example to illustrate. Only 17 time points of FIG. 4 are listed in table 1A and table 1B for the convenience in explanation.

TABLE 1A

| | time point | | | | | | | |
|---|---|---|---|---|---|---|---|---|
| | 0 | 17 | 51 | 85 | 102 | 136 | 153 | 170 | 204 |
| shift quantity before correction | 0.00 | 4.31 | 13.11 | 22.68 | 10.57 | 24.54 | 13.88 | 12.81 | 26.71 |
| shift quantity after correction | 0.00 | 2.16 | 7.45 | 14.61 | 12.48 | 17.90 | 15.81 | 14.24 | 19.62 |

TABLE 1B

| | time point | | | | | | | |
|---|---|---|---|---|---|---|---|---|
| | 221 | 255 | 272 | 306 | 323 | 357 | 374 | 407 |
| shift quantity before correction | 13.21 | 28.36 | 14.27 | 27.42 | 12.62 | 28.92 | 11.17 | 23.44 |
| shift quantity after correction | 16.55 | 21.48 | 18.12 | 21.86 | 17.73 | 22.18 | 17.42 | 19.68 |

Before correction, the shift quantities are taken at the time point A (85 ms), the time point B (102 ms) and the time point C (136 ms) shown in FIG. 4 as examples, the shift quantity at the time point A is 22.68, the shift quantity at the time point B decreases to 10.57, and the shift quantity at the time point C increases to 24.54. That means, the shift quantity decreases sharply from the time point A to the time point B, and increases sharply form the time point B to the time point C, which makes the frame move sometimes slowly (the time point A to the time point B) and sometimes quickly (the time point B to the time point C), and results in a frame jitter problem.

After correction, the shift quantities at each time point between the time point A and the time point C would be closer to each other. The maximum shift quantity difference between the time point A and the time point C decreases from 13.97 (that is, 24.54-10.57) to 5.42 (that is, 17.90-12.48). If the shift quantity at each time point becomes closer to each other, the image moves more smoothly and the frame jitter problem is solved.

Before correction, the shift quantities are taken at the time point D (170 ms), the time point E (204 ms) and the time point F (221 ms) shown in FIG. 4 as an example, the shift quantity at the time point D is 12.81, the shift quantity at the time point E increases to 26.71, and decreases to 13.21 at the time point F. The shift quantity increases sharply from the time point D to the time point E, and decreases sharply form the time point E to the time point F, which makes the frame move sometimes quickly (the time point D to the time point E) and sometimes slowly (the time point E to the time point F), and results in a frame jitter problem.

After correction, the shift quantities at each time point between the time point D and the time point F would be closer to each other. The maximum shift quantity difference between the time point D and the time point F decreases from 13.9 (that is, 26.71-12.81) to 5.38 (that is, 19.62-14.24), which solves the frame jitter problem.

Moreover, after the correction information of the current touch event is obtained, the processing unit 110 stores the correction information of the current touch event to the storage unit 140, and deletes the correction information of the previous touch event stored in the storage unit 140. The storage unit 140 may only store the prediction error value q, the measuring error value r and the gain value $K_t$, the correction position $X_{t|t}$ and the correction error $p_{t|t}$ at the current time point t.

In the embodiment, the X-component is taken as an example, and the calculation of the Y-component is similar with that stated in the previous embodiment. The X-component and the Y-component may also be calculated at the same time, which is not limited herein.

In sum, the previous touch event received at the previous time point is used to correct the current touch event, and the shift quantity calculation is used to improve the reaction time of the non-linear motion, which can solve the frame jitter problem when the calculating speed is high and the storage space needs to be saved.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A method for correcting a touch position applied to an electronic device, the method comprising following steps:
    receiving a current touch event;
    obtaining prediction information of the current touch event based on correction information of a previous touch event which is received at a previous time point before the current touch event;
    obtaining correction information of the current touch event according to the prediction information and a measuring position of the current touch event; and
    updating a position of the current touch event at a display unit by using the correction information of the current touch event,
    wherein the correction information includes a correction position and a correction error, the prediction information includes a prediction position and a prediction error, and the step of obtaining the prediction information of the current touch event based on the correction information of the previous touch event which is received at the previous time point before the current touch event includes:
        regarding the correction position of the previous touch event as the prediction position of the current touch event; and
        taking a total value of the correction error of the previous touch event adding a prediction error value as the prediction error of the current touch event.

2. The method according to claim 1, wherein the step of obtaining the correction information of the current touch event according to the prediction info nation and the measuring position of the current touch event includes:
    calculating a gain value of the current touch event based on the prediction error of the current touch event and a measuring error value;

obtaining the correction position of the current touch event based on the gain value and the prediction position of the current touch event; and obtaining the correction error of the current touch event based on the gain value and the prediction error of the current touch event.

3. The method according to claim 2, wherein the step of calculating the gain value of the current touch event includes:

obtaining the gain value by dividing the prediction error of the current touch event by a total value of the prediction error of the current touch event adding the measuring error value.

4. The method according to claim 2, wherein the step of obtaining the correction position of the current touch event includes:

obtaining the correction position of the current touch event by subtracting the prediction position of the current touch event from the measuring position of the current touch event, multiplying the gain value, and adding the prediction position of the current touch event.

5. The method according to claim 2, wherein the step of obtaining the correction error of the current touch event includes:

obtaining the correction error of the current touch event by subtracting the gain value from 1, and multiplying the prediction error of the current touch event.

6. The method according to claim 2, wherein after the step of obtaining the correction information of the current touch event according to the prediction information and the measuring position of the current touch event, the method further includes:

calculating a shift quantity between the correction position of the current touch event and the correction position of the previous touch event; and adjusting the measuring error value according to the shift quantity.

7. The method according to claim 6, wherein the step of adjusting the measuring error value according to the shift quantity includes:

increasing the prediction error value when the shift quantity is larger than a threshold; and decreasing the measuring error value when the shift quantity is smaller than the threshold.

8. The method according to claim 6, wherein the step of adjusting the measuring error value according to the shift quantity includes:

adjusting the measuring error value according to a predetermined range where the shift quantity is at and an adjusting value corresponding to the predetermined range.

9. The method according to claim 2, wherein after the step of obtaining the correction information of the current touch event according to the prediction information and the measuring position of the current touch event, the method further includes:

calculating a shift quantity between the correction position of the current touch event and the correction position of the previous touch event; and adjusting the prediction error value according to the shift quantity.

10. The method according to claim 1, wherein when the current touch event is received for the first time, the measuring position of the current touch event is regarded as the prediction position of the current touch event.

11. The method according to claim 1, wherein after the step of obtaining the correction information of the current touch event, the method further includes:

storing the correction information of the current touch event to a storage unit; and deleting the correction information of the previous touch event.

* * * * *